(12) United States Patent
Gross (10) Patent No.: US 11,919,619 B2
(45) Date of Patent: Mar. 5, 2024

(54) AIRCRAFT-FLOOR ELEMENT, AIRCRAFT ZONE AND AIRCRAFT HAVING AN AIRCRAFT-FLOOR ELEMENT

(71) Applicant: Airbus Operations GmbH, Hamburg (DE)

(72) Inventor: Claus-Peter Gross, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 1226 days.

(21) Appl. No.: 16/509,748

(22) Filed: Jul. 12, 2019

(65) Prior Publication Data
US 2020/0017187 A1 Jan. 16, 2020

(30) Foreign Application Priority Data
Jul. 13, 2018 (DE) ...................... 10 2018 117 024.6

(51) Int. Cl.
*B64C 1/18* (2006.01)
*B64D 11/00* (2006.01)

(52) U.S. Cl.
CPC ............ *B64C 1/18* (2013.01); *B64D 11/0023* (2013.01); *B64D 2011/0046* (2013.01)

(58) Field of Classification Search
CPC ........ B64D 2011/0046; B64D 11/0023; B64D 2011/0069; B64C 1/18; B64C 1/20; B64C 2001/0027
See application file for complete search history.

(56) References Cited

U.S. PATENT DOCUMENTS

| | | | | |
|---|---|---|---|---|
| 2,396,039 A | * | 3/1946 | Graves | .................. B64D 11/00 296/63 |
| 4,000,870 A | * | 1/1977 | Davies | ...................... B64C 1/20 410/94 |
| 6,808,142 B2 | * | 10/2004 | Oki | .......................... B64C 1/20 244/137.1 |
| 8,360,363 B2 | * | 1/2013 | Gonnsen | ............ B64D 11/0696 52/506.04 |
| 2018/0111689 A1 | | 4/2018 | Huber et al. | |
| 2019/0135407 A1 | * | 5/2019 | Gross | ....................... B64C 1/22 |

FOREIGN PATENT DOCUMENTS

| | | |
|---|---|---|
| DE | 102015104230 A1 | 9/2016 |
| DE | 102015117571 B3 | 12/2016 |
| DE | 102016210856 A1 | 12/2017 |

OTHER PUBLICATIONS

WO-8100836, along with English Translation (Year: 1981).*
German Search Report; priority document.

* cited by examiner

*Primary Examiner* — Nicholas McFall
*Assistant Examiner* — Marisa V Conlon
(74) *Attorney, Agent, or Firm* — Greer, Burns & Crain, Ltd.

(57) ABSTRACT

An aircraft-floor element comprising a first cladding element configure to be swung from a first position to a second position. In the first position, the first cladding element is arranged parallel to a main plane of the aircraft-floor element and on a side of the aircraft-floor element which is directed towards a passenger cabin. In the second position, the first cladding is arranged at an angle to the main plane of the aircraft-floor element, wherein it forms a cladding for a cargo space. An aircraft zone having an aircraft-floor element and an aircraft having such an aircraft zone are also disclosed.

13 Claims, 9 Drawing Sheets

AIRCRAFT-FLOOR ELEMENT, AIRCRAFT ZONE AND AIRCRAFT HAVING AN AIRCRAFT-FLOOR ELEMENT

CROSS-REFERENCES TO RELATED APPLICATIONS

This application claims the benefit of the German patent application No. 10 2018 117 024.6 filed on Jul. 13, 2018, the entire disclosures of which are incorporated herein by way of reference.

FIELD OF THE INVENTION

The invention relates to an aircraft-floor element having a swing-action cladding element, wherein, in a first position, the cladding element forms part of the aircraft-floor element and is directed towards a passenger cabin and, in a second, swung-out position, it forms a cladding for a cargo space.

BACKGROUND OF THE INVENTION

The attempt is made in many vehicles, in particular means of mass transport, for example, aircraft, trains, buses and ships, to make as versatile use as possible of the space available. For example, an interior space of an aircraft can be converted from a passenger cabin to a cargo space, and vice versa. For this purpose, the rows of seats in the passenger cabin have to be removed and, when the cargo space is being formed, it is necessary to ensure, if appropriate, that, in the case of the aircraft having a further passenger region, the cargo space is partitioned off in a gas-tight manner For example, such partitioning serves to avoid the situation where fumes propagate from the cargo space into an adjacent passenger region.

Such conversion work between a passenger cabin and cargo space, or vice versa, is fairly time-consuming, and this results in the aircraft having a relatively long downtime. For example, the downtimes of an aircraft between landing, unloading, reloading and startup (also referred to as turnaround time) are fairly cost-intensive, for which reason aircraft operators want to keep this turnaround time as brief as possible. For example, the aim is to achieve turnaround times of less than 1 hour, but usually of less than 40 minutes.

DE 10 2016 210 856 A1, for example, describes an extendable cargo-stowage space having two stowage-space walls and foldable walls arranged therebetween, it therefore being possible for the cargo-stowage space to assume at least two operating states each with different volumes. For this purpose, the cargo-stowage space can have a linear guide system which allows one of the stowage-space walls to be displaced.

SUMMARY OF THE INVENTION

An object of the invention is to create a system which allows a rapid changeover, which can be implemented as straightforwardly as possible, between a passenger cabin and a cargo space.

In the description hereinbelow, terms such as "parallel" and "perpendicular(ly)" should not be understood in an absolutely precise sense. Rather, they cover all directions which run approximately parallel, or approximately perpendicularly, to a predetermined direction. It is therefore also the case that deviations of up to 10° from the direction specified are covered by the terms "parallel" and "perpendicular(ly)".

According to a first aspect, an aircraft-floor element comprises a first cladding element, which is intended to be swung from a first position to a second position.

An aircraft-floor element should be understood here to mean not just floor elements in the aircraft, that is to say, elements on which passengers or cargo stand, but also further elements of the aircraft which are directed towards an interior space of the aircraft, preferably a passenger cabin and/or a cargo space, or also delimit the same. The aircraft-floor element can thus also be an element of an intermediate floor of a multi-deck aircraft. The aircraft-floor element can likewise be a straightforward ceiling element (for example in the case of a single-deck aircraft or of the uppermost deck of a multi-deck aircraft). An aircraft-floor element is a component which runs essentially horizontally within the aircraft.

In the first position, the first cladding element is arranged parallel to a main plane of the aircraft-floor element and on a side of the aircraft-floor element which is directed towards a passenger cabin. Main plane of the aircraft-floor element should be understood here to mean a plane which extends in the directions of the greatest extent of the aircraft-floor element. The direction of the height or thickness of the aircraft-floor element runs perpendicularly to the main plane.

In the second position, the first cladding element is arranged at an angle to the main plane of the aircraft-floor element and forms a cladding for a cargo space. The swing action (swing-out action, swing-round action) of the cladding element can uncover an unexposed side of the cladding element which is arranged in the aircraft-floor element beforehand, and is suitable for cladding a cargo space. In other words, the swing action of the cladding element allows the passenger cabin to be converted to a cargo space. In particular, a part or portion of a boundary of the passenger-cabin space can be swung round and then delimits a cargo space. The latter is the same, converted space within the aircraft.

In order to allow swing action of the cladding element, the aircraft-floor element has at least one joint or hinge, via which the cladding element is connected in a rotatable manner to the rest of the aircraft-floor element. As an alternative, it is also possible for the cladding element to be fastened in a releasable manner in the aircraft-floor element and to be inserted into an opening or holder provided for this purpose in the aircraft-floor element. The opening or holder in the aircraft-floor element is provided, for this purpose, in the region of an axis of rotation of the cladding element.

In a variant, in the first position, the first cladding element can form a cladding for the passenger cabin. The cladding of the passenger cabin constitutes a visible surface of an element which delimits the passenger cabin. When the first cladding element forms such a cladding, the cladding element has a surface (a side) which, in the first position, is visible and forms the cladding of the passenger cabin. Visual adaptation can thus be implemented in accordance with the wishes of the aircraft operator, for example by way of a surface in a desired color, with a desired pattern, with a desired texture, with a desired inscription, etc.

In a further variant, in the second position, the first cladding element can form a side wall, a rear wall or a front wall of the cargo space. Since, in a cargo space, the side walls, rear walls and front walls are arranged essentially perpendicularly to a floor plane and/or ceiling plane, the first cladding element is swung approximately through 90° in order to form the cargo-space cladding or cargo-space boundary. All that is required is for the cladding elements to be moved from the first position into the second position or from the second position into the first position. By virtue of the cladding element being swung round through approximately 90°, the previously visible surface (side) of the cladding element is now oriented away from the interior of the cargo space. This means that cargo cannot come into contact with this surface of the cladding element, as a result of which, in the second position of the cladding element, the surface is protected against damage.

It is also possible, on at least one side edge, for the first cladding element to have a sealing element, which is intended to establish a gas-tight termination between the first cladding element and a further element. The further element can likewise be a cladding element, for example an adjacent cladding element. As an alternative, or in addition, it is also possible for the sealing element to establish a gas-tight termination between the cladding element and a floor or a ceiling of the cargo space. The at least one side edge can be any desired side edge of the cladding element as well as any desired number of side edges of the cladding element, including all the side edges. This makes it possible to create a gas-tight cargo space, and therefore, in the event of any fumes developing or of other hazardous substances being released, the fumes or hazardous substances cannot reach further passenger regions, and therefore cannot harm the passengers.

As an alternative, or in addition, it is also possible for the sealing element to establish a liquid-tight (for example, water-tight) termination in relation to a further element (including a further cladding element). This prevents liquids from escaping from the cargo space into other regions of the aircraft.

Likewise as an alternative, or in addition, it is also possible for the sealing element to be arranged such that it establishes a liquid-tight (for example, water-tight) termination in relation to a further element (including a further cladding element) when it is located in the first position. As an option, the aircraft-floor element and/or the cladding element can also (each) comprise at least one further sealing element, and therefore at least one zone of the passenger cabin is liquid-tight in relation to an area surrounding the passenger cabin (the converted space which forms the passenger cabin). It is thus possible to prevent a liquid from entering into the passenger cabin from another region of the aircraft. For example, in the event of an emergency landing of the aircraft on water, the passenger cabin can thus be protected against the ingress of water and the passengers can leave the aircraft safely. In particular, in the case of cargo space/passenger cabins which are located beneath a water line of an aircraft which has executed an emergency landing on water, this increases the passenger safety.

In yet a further variant, the aircraft-floor element can be intended to form an intermediate floor of an aircraft. The first cladding element here is arranged on an underside of the intermediate floor, the underside forming a ceiling of the passenger cabin. The aircraft-floor element can also be a ceiling element of the aircraft. The first cladding element of the aircraft-floor element can have a visible surface which forms a cladding of the passenger cabin when the first cladding element is located in the first position. As an alternative, the first cladding element can also be arranged in a concealed state in the aircraft-floor element. For example, the first cladding element can be concealed by a further cladding element, the cladding elements, in their respective first position, being arranged parallel to one another and overlapping at least to some extent as seen in a direction perpendicular to the main plane of the aircraft-floor element.

It is also possible for the aircraft-floor element to comprise at least one seat rail. In the first position here, the first cladding element forms a floor of the passenger cabin and is formed such that the at least one seat rail is at least partially exposed when the first cladding element is located in the first position. For this purpose, the first cladding element can be formed in a number of parts. At least two parts of the first cladding element here are spaced apart from one another, and therefore, in the respectively first position of the at least two parts of the first cladding element, the seat rail is exposed alongside the respective part of the first cladding element. In other words, a side edge of each part of the first cladding element ends up located alongside the seat rail when the part is moved into the first position.

As an alternative, the seat rail can be formed in a number of parts in the longitudinal direction. The first cladding element here has openings through which the seat rail projects when the first cladding element is located in the first position. It is possible here for the seat rail to be interrupted in the longitudinal direction such that a portion of the first cladding element, for example a crosspiece between two openings, ends up located between the interrupted portions of the seat rail when the first cladding element is moved into the first position.

As an alternative, or in addition, the aircraft-floor element can comprise a cargo-loading and/or -fastening system. The cargo-loading system and/or cargo-fastening system is at least any desired element for bearing, supporting, displacing and/or fixing any desired cargo item. For example, it can be a rail having rollers for displacing cargo containers. It is likewise possible for anchoring elements and locking elements for cargo containers to belong to such a cargo-fastening system. Finally, anchoring elements for nets for loose cargo items and baggage items also form part of such a cargo-loading system.

The first cladding element here can cover the cargo-loading and/or -fastening system when the first cladding element is located in the first position. For this purpose, it is possible for the first cladding element, as seen, in the first position, on a side which is directed away from the passenger cabin (an underside of the first cladding element), to have recesses, in which the cargo-loading and/or -fastening system is accommodated. The first cladding element can also have, at least in part, a continuously planar underside, which rests on the elements of the cargo-loading and/or -fastening system when the first cladding element is located in the first position. If the first cladding element is swung into the second position, the elements of the cargo-loading and/or -fastening system are freed.

In a further variant, the aircraft-floor element can comprise a locking element, which is intended to fix the first cladding element in the first position and/or in the second position. The locking element can be configured in two parts, wherein a first part is arranged on the first cladding element and a second part is arranged at an aircraft-floor-element position which corresponds with the first part when the first cladding element is located in the first position. It is also possible for the first cladding element, in particular when it is visible from the passenger cabin (that is to say, when it is located in the first position), to comprise a release mechanism, which unlocks the locking element.

In yet a further variant, on a side which forms the cladding for the cargo space, the first cladding element can have an impact-resistant and/or scratch-resistant surface. As an alternative, or in addition, on a side which is located opposite the impact-resistant and/or scratch-resistant surface, the first cladding element can have a surface which forms the cladding for the passenger cabin (a so-called lining) This means that, by virtue of the first cladding element being swung from the first position into the second position, a passenger cabin can be rapidly converted into a cargo space. In addition, in the cargo-space configuration, that side of the first cladding element which is visible in the passenger-cabin configuration is located on the side directed away from the cargo space and is therefore protected against damage.

In addition, the optionally provided at least one sealing element of the cladding element can prevent soiling of the passenger-cabin surface (lining) when the cladding element is located in the second position (cargo-space configuration). Therefore, the passenger-cabin surface is protected against becoming dirty and it is possible to dispense with cleaning following conversion to the passenger cabin.

According to a second aspect, an aircraft zone comprises at least one aircraft-floor element according to the first aspect, or a variant thereof. For example, the aircraft zone can comprise at least two aircraft-floor elements which are arranged on a ceiling of the passenger cabin/of the cargo space such that the respective first cladding elements form a lateral boundary of the resulting cargo space when they are in the second position. It is likewise possible for at least two aircraft-floor elements to be arranged on a floor of the aircraft zone such that the respective first cladding elements form a lateral boundary of the resulting cargo space when they are in the second position. In both cases, the lateral boundary can form a lateral boundary which runs in the longitudinal direction of the aircraft or a lateral boundary which runs in the transverse direction of the aircraft (perpendicularly to the longitudinal direction) (rear wall or front wall).

It is possible here for the aircraft-floor elements and/or the respective first cladding elements to be dimensioned such that, in their second position, the first cladding elements extend over the entire height of the cargo space. As an alternative, the respective first cladding elements can be dimensioned such that they extend over the height of the cargo space at least to the extent where they overlap with a first cladding element of another aircraft-floor element or extend close enough thereto to achieve a gas-tight and/or liquid-tight termination between the two cladding elements. For example, in its second position, a first cladding element of an aircraft-floor element installed on the aircraft floor can have an upper side edge corresponding with a lower side edge of a cladding element which is located in the second position and belongs to an aircraft-floor element installed on the ceiling of the cargo space, such that a gas-tight and/or liquid-tight termination can be established between the two side edges (for example by means of sealing elements) or the two side edges run at different heights, the cladding elements overlapping at least to some extent.

In a variant, the aircraft zone can comprise at least one side-wall cladding for the passenger cabin. The side-wall cladding forms a visible surface of a boundary of the passenger cabin. For example, the side-wall cladding is arranged on fuselage elements of the aircraft, in order to conceal the elements. As an alternative, or in addition, the side-wall cladding can also be arranged in the interior space of the aircraft. For example, it can be arranged in a freestanding state in the longitudinal direction or transverse direction of the aircraft. If the first cladding element is then moved into the second position, the first cladding element can conceal, and thus protect, the side-wall cladding of the passenger cabin.

The at least one side-wall cladding can also comprise at least one sealing element, in order to provide a gas-tight and/or liquid-tight boundary of the passenger cabin. This likewise contributes to passenger safety since, in the passenger-cabin configuration, it is not possible for gas or liquid to pass into the passenger cabin and, in the cargo-space configuration, it is not possible for gas or liquid to pass into other regions of the aircraft.

It is also possible for a space between the side-wall cladding of the passenger cabin and the fuselage elements of the aircraft to be used in the form of further stowage space. For example, on the side which is directed towards the fuselage element of the aircraft, the side-wall cladding can have a (closable) baggage compartment. This allows passengers to stow hand baggage or the like in the baggage compartment without the baggage compartment restricting utilization of the cargo space in the cargo-space configuration.

In a further variant, the aircraft zone can also comprise a second cladding element, which can be swung from a first position into a second position. The second cladding element can be fastened in a rotatable manner, for example, on a side wall (side-wall cladding) of the passenger cabin. It is also possible, when the second cladding element is located in the second position, for a surface of the second cladding element which, in the first position of the second cladding element, is directed towards the passenger cabin to essentially fully cover over a surface of the rest of the side wall (side-wall cladding) which is directed towards the passenger cabin. In other words, the second cladding element can be swung against an adjacent side-wall cladding, and therefore those sides (surfaces) of the cladding element and of the side-wall cladding which previously form the surface of the passenger cabin rest one upon the other and are therefore protected against damage.

In yet a further variant, the aircraft zone can also comprise a cargo-space door, which allows access from an area surrounding an aircraft into the aircraft zone. For example, this can be a conventional cargo-space door in an outer skin of the aircraft. As an alternative, or in addition, it can also be a cargo-space door which allows access into the cargo space from another region within the aircraft. For example, such a cargo-space door can be located in a side wall (front wall, rear wall or side wall running in the longitudinal direction of the aircraft) of the cargo space.

As an option here, the aircraft-floor element can have a third cladding element, which is intended to be swung from a first position to a second position. The third cladding element can be arranged such that, in the first position, it frees access from the cargo space to the cargo-space door and, in the second position, it conceals the access from the cargo space to the cargo-space door. For example, in the first position, the first cladding element can form a side wall of the passenger cabin and can conceal the cargo-space door in the process and, in the second position, it can free the cargo-space door. It is thus possible for the first cladding element to be swung about a vertical or horizontal axis in order to form a side wall or else a ceiling or a floor of the cargo space. In the first position, the third cladding element here is arranged at an angle to the main plane of the aircraft-floor element (for example perpendicularly to the main plane) and forms a cladding (visible surface) of the passenger cabin. In the second position, the third cladding element either is arranged parallel to the main plane of the aircraft-floor element and forms an aircraft floor or a ceiling of the cargo space or the third cladding element is arranged likewise at an angle (for example perpendicularly) to the main plane of the aircraft-floor element and forms a side-wall cladding for the cargo space. In other words, the swing action (swing-out action, swing-round action) of the third cladding element can uncover a side of the cladding element which is directed away from the passenger cabin beforehand, and is suitable for cladding a cargo space.

According to a further aspect, an aircraft comprises an aircraft zone according to the second aspect. The aircraft can be a different vehicle, for example a bus, a train, a ship or another means of mass transport.

The configurations, variants and aspects described here can also be combined as desired, and so other variants which have not been described explicitly are also included.

BRIEF DESCRIPTION OF THE DRAWINGS

Exemplary embodiments of the invention will be described in more detail hereinbelow with reference to the drawings, in which.

DETAILED DESCRIPTION OF THE PREFERRED EMBODIMENTS

The present invention describes an aircraft-floor element, an aircraft region and an aircraft having cladding elements, which allow an aircraft region to be converted from a passenger cabin to a cargo space, and vice versa.

Figure 1:
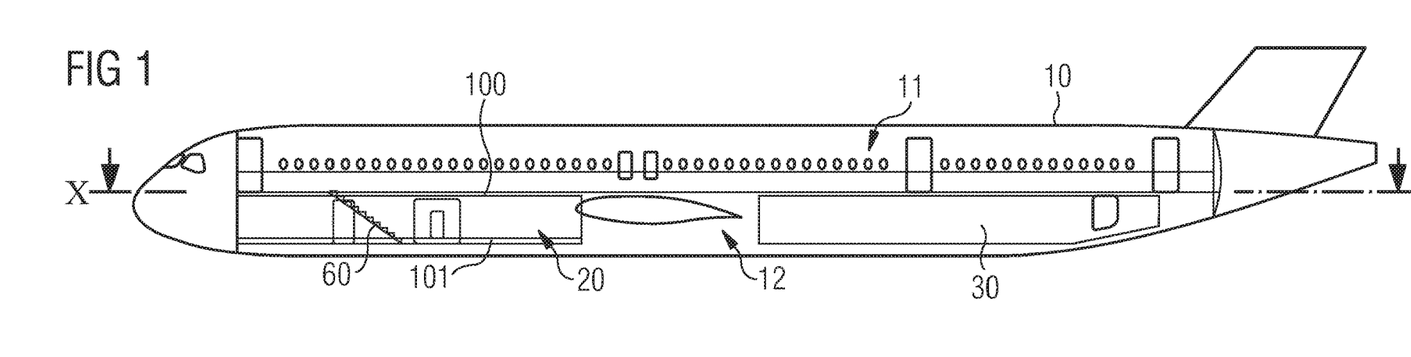
FIG. 1 shows, schematically, a vertical longitudinal section through an aircraft.

FIG. 1 shows, schematically, a vertical longitudinal section through an aircraft 10. An aircraft is illustrated here merely by way of example. The aircraft 10 has at least one deck 11, 12 (plane), in which passengers and/or cargo can be accommodated. The aircraft 10 which is shown in FIG. 1 thus has an intermediate floor 100, which separates an upper deck 11 from a lower deck 12. A flight of stairs 60 connects the upper deck 11 to the lower deck 12. The aircraft region 20 in the lower deck 12 also has a floor 101, and therefore an interior space of the aircraft is present between the intermediate floor 100 and the floor 101, for optional use as a passenger cabin or cargo space.

While a description is given hereinbelow, by way of example, of the aircraft region 20 in the lower deck 12, the technology disclosed here can also be used in any other desired aircraft region of the upper deck or also of the lower deck, such as for example in the cargo space 30.

Figure 2:
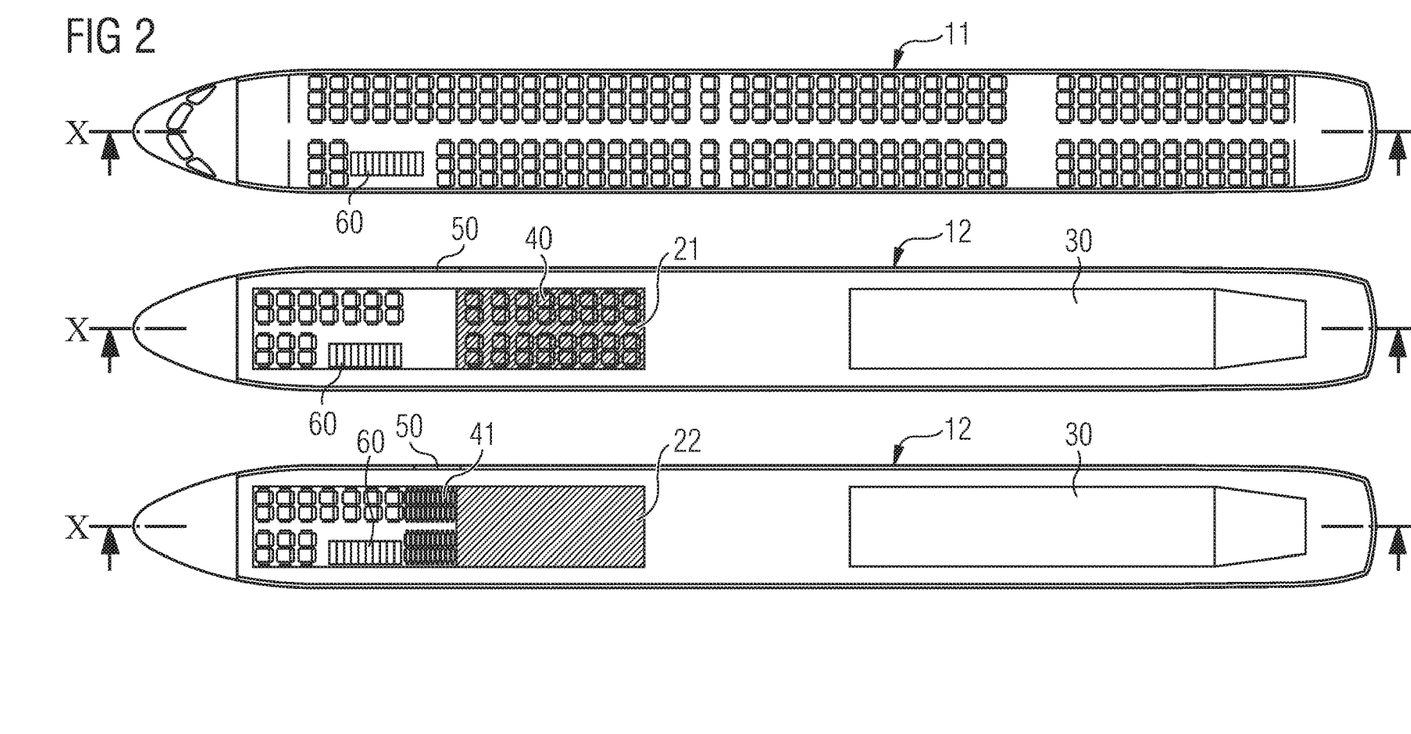
FIG. 2 shows, schematically, horizontal longitudinal sections through an upper deck and two configurations of a lower deck of the aircraft from FIG. 1.

FIG. 2 shows, schematically, horizontal longitudinal sections through an upper deck 11 and two configurations of a lower deck 12 of the aircraft 10 from FIG. 1. Whereas for example the upper deck 11 is configured entirely in the form of a passenger cabin, the lower deck 12, in addition to exclusively a cargo space 30, has an aircraft region 20 which can be used either as a passenger cabin 21 or as a cargo space 22. As an option, it is also possible for a zone alongside the aircraft region 20 to be used as a passenger cabin, as is illustrated in the lower deck 12 alongside the flight of stairs 60. The cargo space 22 and/or the passenger cabin 21 can be accessible via a cargo-space door 50, i.e. the aircraft region 20 can be reached from a surrounding area outside the aircraft 10 through the cargo-space door 50.

It is possible for the seats 40 in the aircraft region 20 either to be released from an aircraft floor and removed from the aircraft 10, for example via the cargo-space door 50 or as an alternative, as illustrated in FIG. 2, to be pushed together. Passenger seats 41 which can be pushed together are known and will therefore not be described in any more detail here. The seats 41 which can be pushed together allow the aircraft 10 to assume one of the two configurations 21, 22 at any time and to be converted at any time without the passenger seats 40, 41 having to be stored outside the aircraft and possibly not being available for (subsequent) installation.

Figure 3:
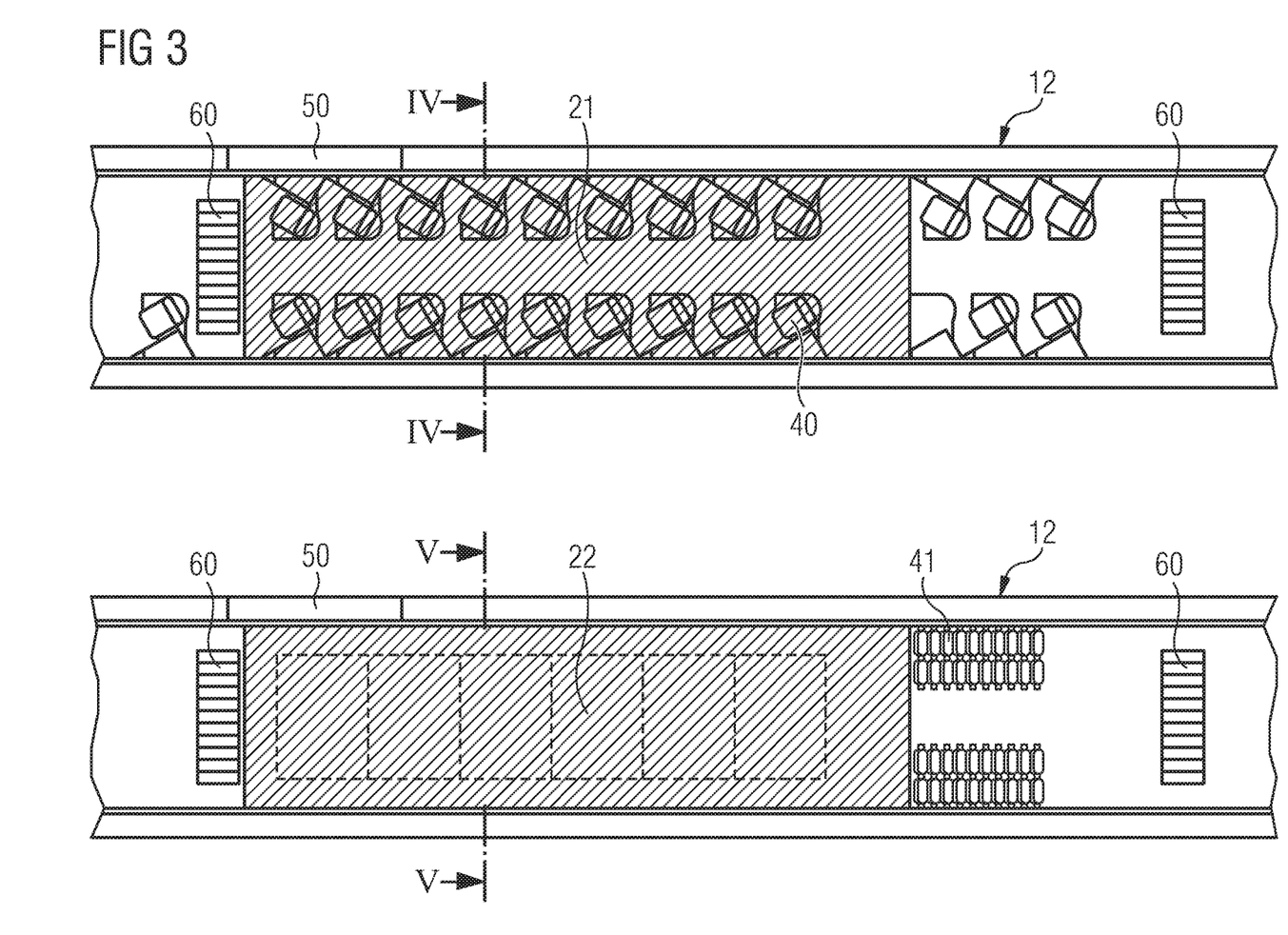
FIG. 3 shows, schematically, details of horizontal longitudinal sections through two configurations of a lower deck of an aircraft.

FIG. 3 shows, schematically, horizontal longitudinal sections through two similar configurations of a lower deck 12 of an aircraft 10. In contrast to the variant illustrated in FIG. 2, the aircraft region 20 is accessible via two flights of stairs 60, and a passenger region is no longer present when the cargo-space configuration 22 has been implemented. Here too, the passenger seats 40 can be pushed together and stored, in the form of pushed-together seats 41, in the aircraft.

Figure 4:
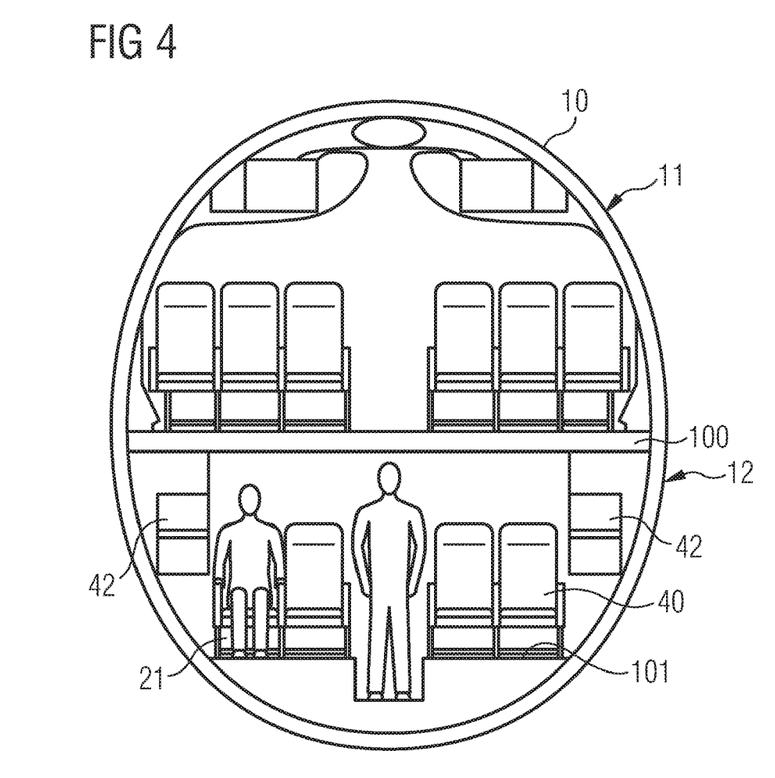
FIG. 4 shows, schematically, a cross-sectional view of the aircraft taken along section line IV-IV from FIG. 3.

FIG. 4 shows, schematically, a cross-sectional view of the aircraft 10 taken along section line IV-IV from FIG. 3. The upper deck 11 with the intermediate floor 100 and the lower deck 12 located therebeneath are clearly evident. The dashed cross-sectional shape of the lower deck 12 can reflect, for example, a zone of the aircraft 10 which is located towards the rear, and is not high enough for a passenger cabin (see also FIG. 1). Passenger seats 40 can be arranged on the aircraft-floor element 101 in that part of the lower deck 12 which is illustrated by solid lines (sufficient height). Alongside the seats, it is also possible to install baggage compartments 42 for the passengers. As an option, it is also possible for a personal service unit (PSU), including an emergency oxygen supply, to be integrated in the aircraft-floor element 100, which forms a ceiling, or in a side wall 102 of the passenger cabin 21, above the passenger seats. Likewise as an option, a depression can also be provided in the aircraft floor 101, this making it possible for a person to stand upright in this region, for example along a gangway in the longitudinal direction (X axis) of the aircraft 10.

Figure 5:
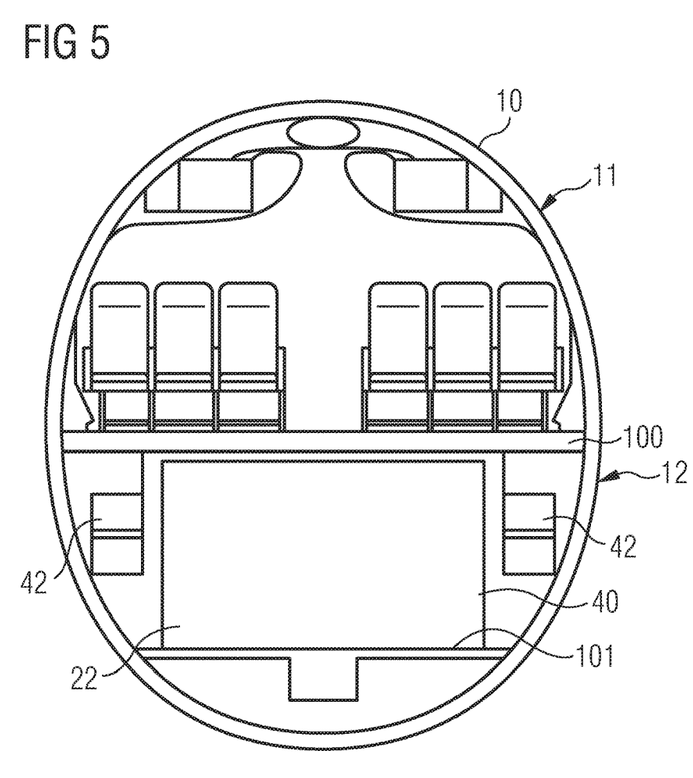
FIG. 5 shows, schematically, a cross-sectional view of the aircraft taken along section line V-V from FIG. 3.

FIG. 5 shows, schematically, a cross-sectional view of the aircraft 10 taken along section line V-V from FIG. 3. This figure deals with the same cross-sectional plane of the aircraft 10 as in FIG. 4, but in the cargo-space configuration 22 instead of the passenger-cabin configuration 21 illustrated in FIG. 4.

Figure 6:
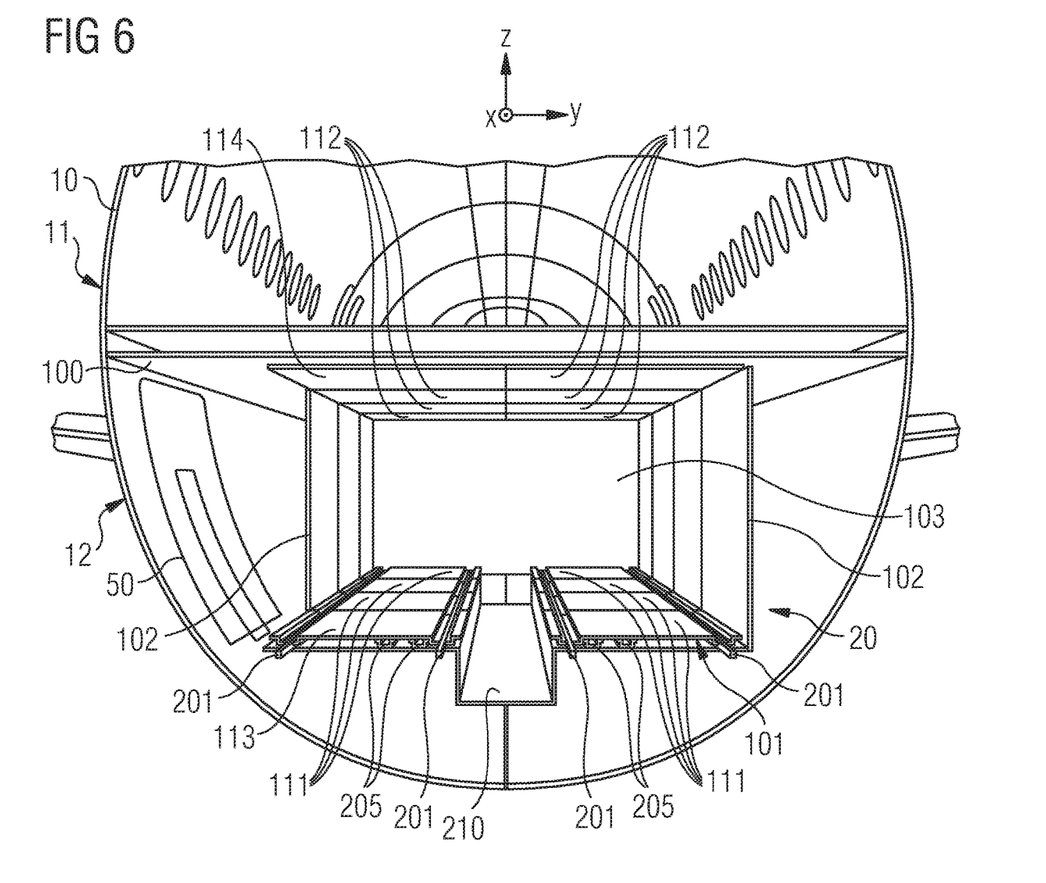
FIG. 6 shows, schematically, a perspective cross-sectional view of an aircraft region.

FIG. 6 shows, schematically, a perspective cross-sectional view of an aircraft region 20. At least part of the upper deck 11 of the aircraft 10 can be seen here. The interior space of the lower deck 12 of the aircraft 10, the interior space being located beneath the intermediate floor 100, is illustrated in the passenger-cabin configuration 21, but, in order to maintain clarity in FIG. 6, the passenger seats 40 have not been illustrated. The passenger cabin 21 is delimited not just by the intermediate floor 100 and the floor 101, but also by a rear wall 103 and optional side walls 102. Of course, the passenger cabin 21 can also be delimited by a front wall, but this cannot be seen in the selected perspective view into the interior space of the passenger cabin 21.

The cargo-space door 50 can provide access to the aircraft region 20, in particular for access to the aircraft region 20 from an area surrounding the aircraft 10. Of course, the aircraft region 20 can also be accessed from the upper deck 11 via a flight of stairs 60 (FIG. 2).

In order, then, to provide for rapid conversion of the passenger cabin 21 into a cargo space 22, the aircraft region 20 has at least one aircraft-floor element 100, 101, of which each comprises at least one first cladding element 111-115. FIG. 6 illustrates first cladding elements 112 and 114 of the aircraft-floor elements 100 of the intermediate floor. The first cladding elements 111 and 113 of the elements 101 of the aircraft floor are also illustrated. The functioning of these cladding elements will be explained in more detail hereinbelow with reference to FIGS. 7 to 14. The elements 101 of the aircraft floor also have at least one seat rail 201 for fitting the passenger seats 40 in the passenger cabin 21 and also a cargo-loading and/or -fastening system 205 for moving and fastening cargo containers and/or loose cargo items.

The first cladding elements 111-114, which can be seen in FIG. 6, are all located in a first position, in which they are arranged parallel to a main plane of the respective aircraft-floor element 100, 101 and on a side of the aircraft-floor element 100, 101 which is directed towards a passenger cabin 21. The main plane of the aircraft-floor element 100, 101 is located in the X-Y plane. Each of the first cladding elements 111-114 forms a cladding for the passenger cabin 21 and can be swung from the first position to a second position.

Figure 7:
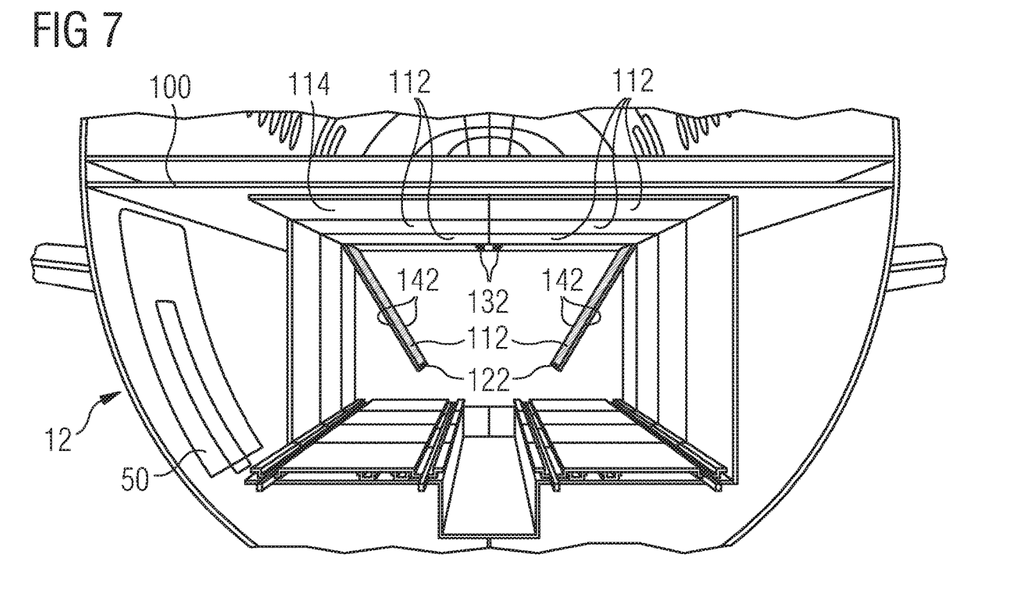
FIGS. 7 and 8 show, schematically, various states during the swing action of cladding elements of the aircraft region from FIG. 6, FIGS. 9 and 10 show, schematically, various states during the swing action of other cladding elements of the aircraft region from FIG. 6, FIGS. 11 and 12 show, schematically, various states during the swing action of yet other cladding elements of the aircraft region from FIG. 6, FIGS. 13 and 14 show, schematically, various states during the swing action of yet further cladding elements of the aircraft region from FIG. 6, and FIGS. 15 and 16 show, schematically, various states during the swing action of cladding elements on a rear wall of the aircraft region from FIG. 6.
Figure 8:
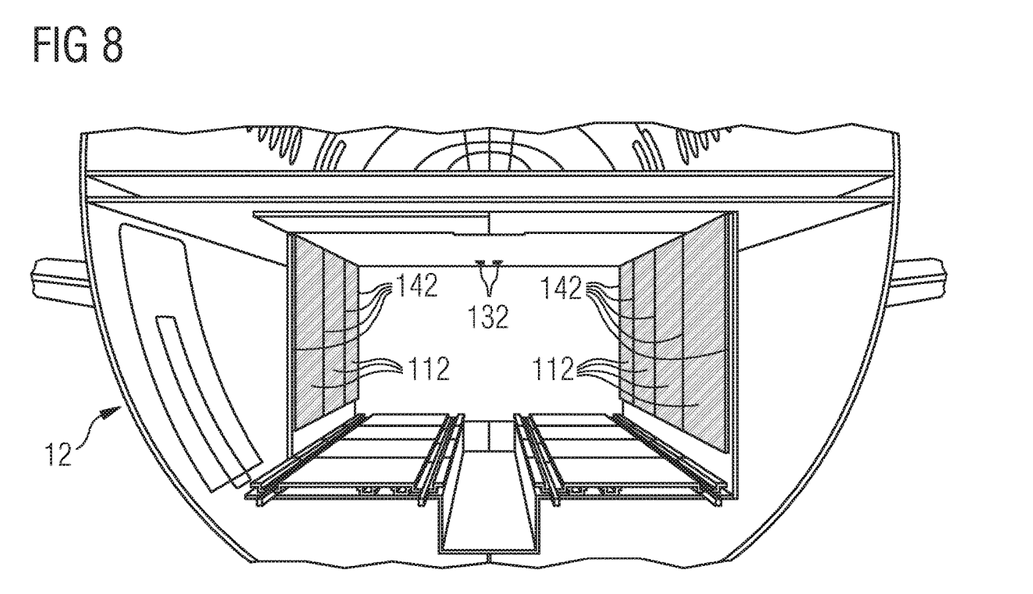

FIGS. 7 and 8 show, schematically, various states during the swing action of the cladding elements 112 in the ceiling region of the aircraft region 20 from FIG. 6. Whereas FIG. 7 illustrates a state between the first position and a second position of two cladding elements 112, all the cladding elements 112 from the ceiling region 100 of the aircraft region 20 are located in the second position in FIG. 8. In this second position, the cladding elements 112 are arranged at an angle to the main plane of the aircraft-floor element 100. In order to form a side wall of a cargo space, the cladding elements 112 in the second position are oriented perpendicularly to the main plane of the aircraft-floor element 100. The cladding elements 112 thus form a cladding for a cargo space 22. For example, the cladding elements 112 have an impact-resistant and/or scratch-resistant surface, which in the second position is directed towards the cargo space.

It is also possible for the cladding elements 112, on at least one side edge, to have a sealing element 142, which is intended to establish a gas-tight and/or liquid-tight termination between the cladding element 112 and a further element. A sealing element 142 of one cladding element 112 can thus establish a gas-tight and/or liquid-tight termination with a side edge of an adjacent cladding element 112, or with a sealing element 142 of an adjacent cladding element 112.

It is also possible for the cladding elements 112 to have a locking element 122, 132, which is intended to lock, or to fix, the cladding element 112 in the first position and/or in the second position. The locking element 122, 132 can have a part 122, which is fitted on the cladding element 112 and can undergo force-fitting and/or form-fitting coupling with a further part 132, which is fitted, for example, on the aircraft-floor element 100, in order for the cladding element 112 to be fixed in the respective position. In a simple configuration, a displaceable or rotatable catch 122 is arranged on the cladding element 112 and can undergo form-fitting, releasable connection with an opening of a corresponding counterpart 132.

Figure 9:
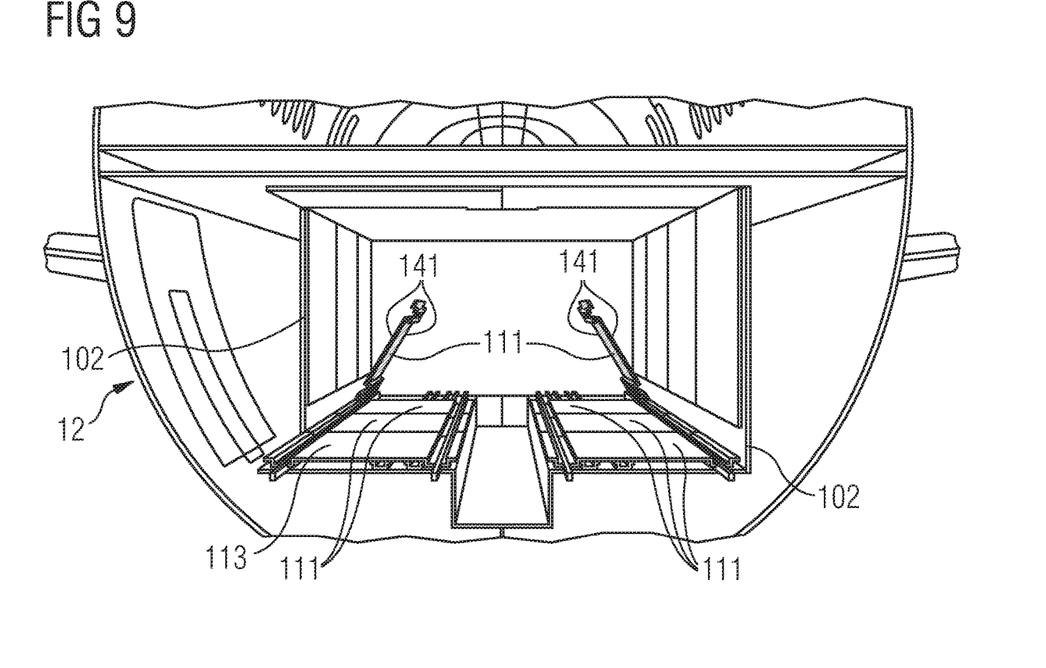
Figure 10:
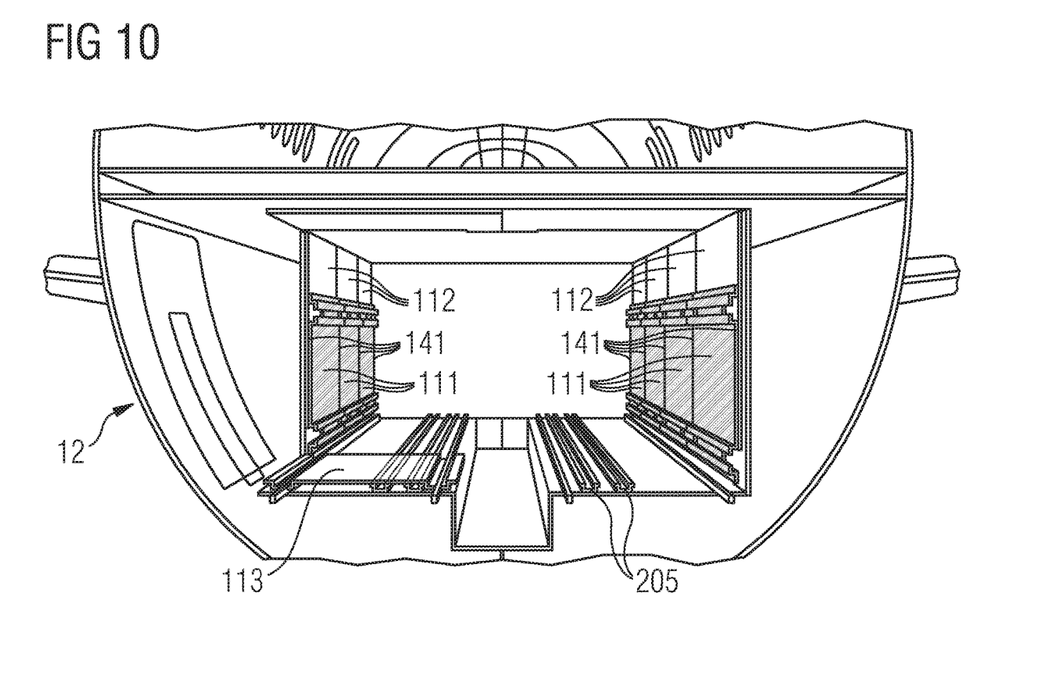

FIGS. 9 and 10 show, schematically, various states during the swing action of other cladding elements 111 of the aircraft region 20 from FIG. 6, in particular of cladding elements 111 of the element 101 on the aircraft floor. Here too, the cladding elements 111 can assume at least two positions, wherein, in a first position, the cladding element 111 is arranged parallel to a main plane of the aircraft-floor element 101 and on a side of the aircraft-floor element 101 which is directed towards a passenger cabin 21. In the second position, the cladding element 111 is arranged at an angle (for example perpendicularly) to the main plane of the aircraft-floor element 101 and forms a cladding for a cargo space 22. Here too, at least one side edge of the cladding element 111 can comprise a sealing element 141 for a gas-tight and/or liquid-tight termination in relation to a further cladding element or another part of the aircraft region 20.

In FIGS. 9 and 10, the cladding elements 111 are illustrated such that they overlap in the vertical direction (Z axis) with the cladding elements 112 swung down from the aircraft-floor elements 100 located on the ceiling. It is possible here for a sealing element to be arranged on a side edge of the cladding element 111 or 112 which is equivalent to an end side (on the side opposite the axis of rotation of the cladding element 111 or 112), such that the sealing element achieves a gas-tight and/or liquid-tight termination with the overlapping cladding element 112 or 111. Of course, the cladding elements 111 and 112 can be dimensioned such that, in the respective second position of the cladding elements 111, 112, their respective end-side side edges butt against one another, or sealing elements 141, 142 on the side edges butt against one another.

As an alternative, it is also possible for the cladding elements 111, 112 not to establish a gas-tight and/or liquid-tight termination. For example, in their respective second position, the cladding elements 111, 112 can be located in front of a respective side wall 102. The respective side wall 102 can be installed in the aircraft region 20, here such that it provides for a gas-tight and/or liquid-tight termination between the passenger cabin/cargo space 21, 22 and the rest of the interior space of the aircraft region 20.

The cladding element 111 can be formed such that a seat rail 201 is at least partially exposed when the cladding element 111 is located in the first position. As can be seen in FIG. 9, the seat rail 201 is formed in a number of parts in the longitudinal direction and the cladding element 111 has openings 123 (see also FIG. 11) through which the seat rail 201 projects into the interior space of the passenger cabin 21 when the cladding element 111 is located in the first position. In addition, the cladding element 111 is configured such that it covers the cargo-loading and/or -fastening system 205 (FIG. 9) when it is located in the first position, and frees the system 205 (FIG. 10) when it is located in the second position. Here too, locking elements (not illustrated) can be provided in order to fix the cladding element 111 at least in the second position (FIG. 10).

Figure 11:
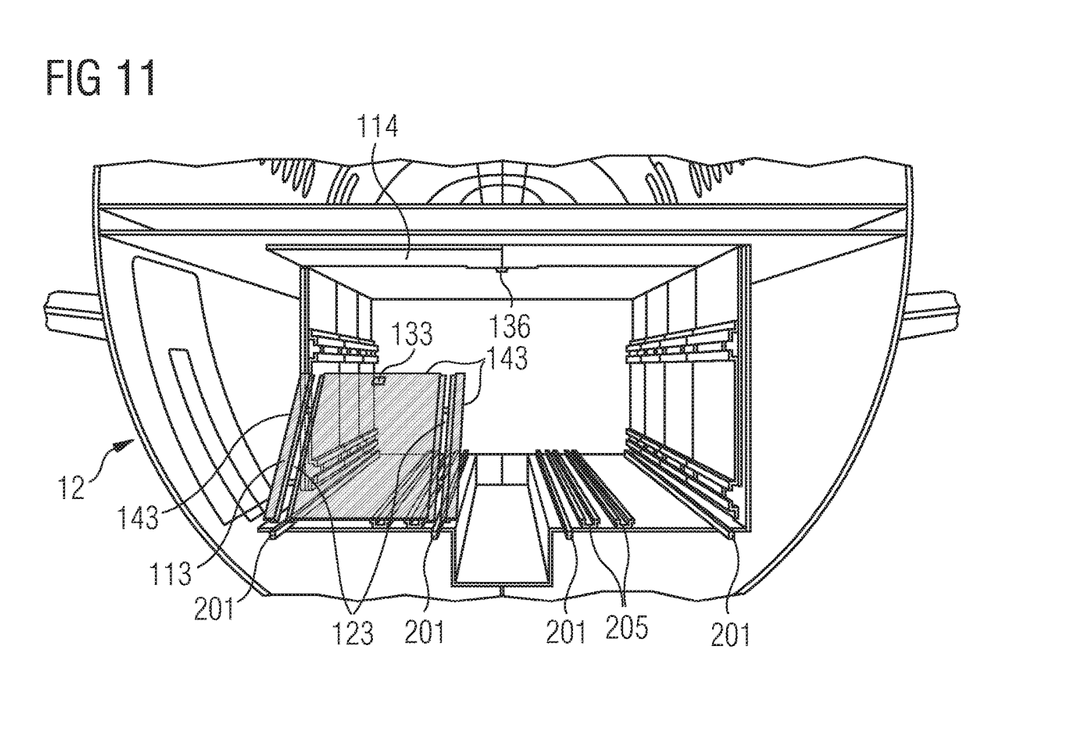
Figure 12:
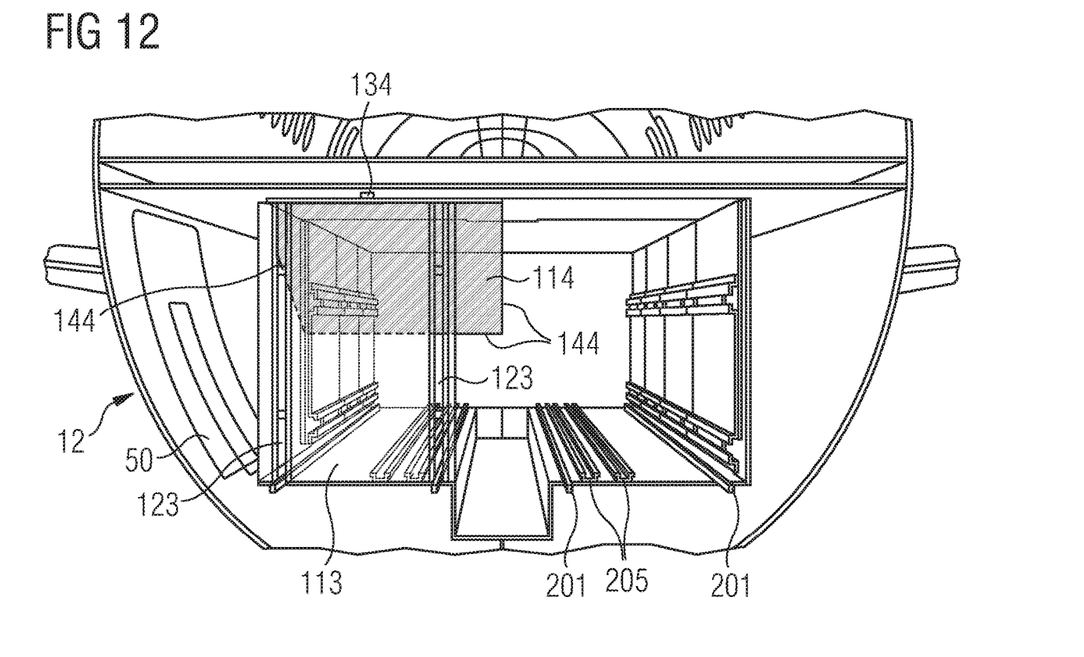

FIGS. 11 and 12 show, schematically, various states during the swing action of yet other cladding elements 113, 114 of the aircraft region 20 from FIG. 6. These are, in particular, cladding elements 113, 114 in the region of the cargo-space door 50. The cladding element 113 thus corresponds to one of the cladding elements 111, but the axis about which the cladding element 113 swings has been rotated through 90° in relation to the axis about which the cladding element 111 swings. The cladding element 113 has to be moved differently here so as not to block the access to the cargo-space door 50.

The openings 123, through which the seat rails 201 can project, can be seen to better effect in FIG. 11. In addition, also on the cladding element 113 it is possible for at least one sealing element 143 to be arranged on at least one of the side edges of the cladding element 113. FIG. 12 illustrates the cladding element 113 in its second position (upright position). Locking element 113, 134 can be used to fix the cladding element 113 in the second position, for example on a part 134 of the locking element which is arranged on the aircraft-floor element 100, which forms an intermediate floor of the aircraft 10.

Figure 13:
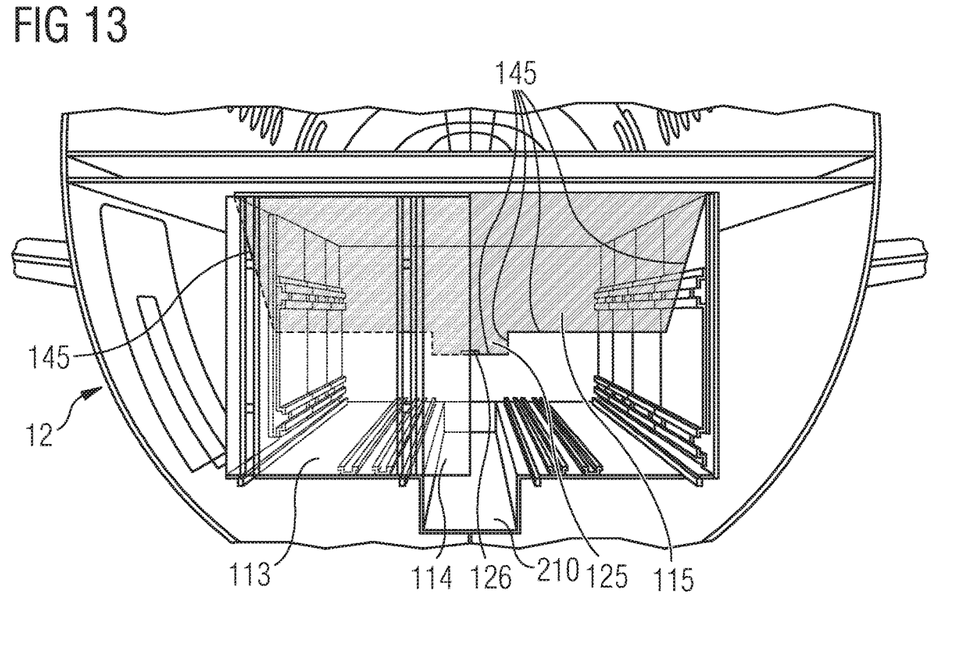

The cladding element 114 is an optional cladding element, since, in its second position—as illustrated in FIGS. 12 and 13—it is arranged in front of the cladding element 113 in its second position. As an alternative, it would also be possible, in the passenger-cabin configuration 21 (first position), for the cladding element 114 to be arranged parallel to the side wall 102 and in front of the cargo-space door 50 (in contrast to the arrangement illustrated in FIG. 11), in order to conceal the cargo-space door 50 for the passengers. In this case, it would be advantageous if the cladding element 114 is mounted for rotation along a side edge other than is shown in FIG. 12. For example, in the second position of the cladding element 114, the latter either could be swung upwards to the aircraft-floor element 100, and fixed there, or could be swung to the side, in front of the cladding element 113 located in its second position, and fixed there.

Figure 14:
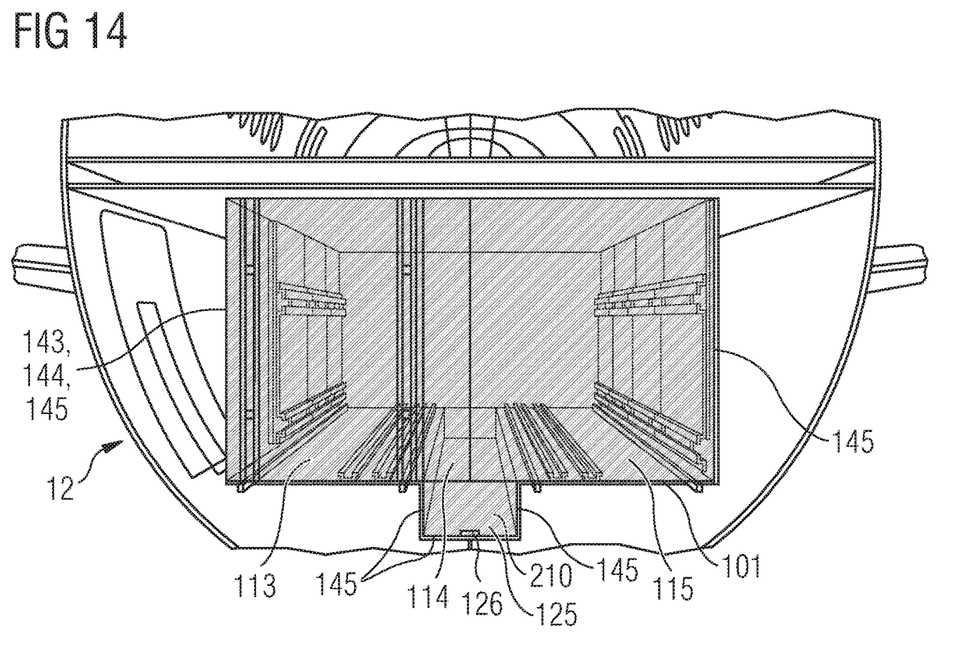

FIGS. 13 and 14 show, schematically, various states during the swing action of yet a further cladding element 115 of the aircraft region 20 from FIG. 6. This cladding element 115, in its first position (parallel to the main plane of the aircraft-floor element 100), can be concealed by at least one further cladding element 112, 114, that is to say, can overlap therewith. Therefore, in the case of the cladding element 115, it is possible, at least in the regions which are overlapped by the other cladding elements 112, 114, to dispense with a surface which forms the cladding of the passenger cabin 21.

The cladding element 115, which functions like a large door or shutter can form an entire side wall, in this case front wall, of the cargo space 22. Of course, the cladding element 115 or a corresponding cladding element (not illustrated specifically) can also form a rear wall of the cargo space 22. The cladding element 115 here can also have an additional portion 125, which closes a gangway-forming depression 210 in the floor 101 of the aircraft 10. The cladding element 115 can have sealing elements 145 on each side edge, in order to ensure a gas-tight and/or liquid-tight closure of the side wall (front wall). It is also possible for the cladding element 115 to have a locking element 126, in order to fix the cladding element 115 at least in its first position on/in the aircraft-floor element 100.

The cladding element 115, which functions like a large door or shutter, can establish a very rapid gas-tight and/or liquid-tight termination of the cargo space 22 in relation to the rest of the interior space of the aircraft 10. For the case where the side wall of the cargo space 22 has a straightforward rectangular cross section, it is also possible to dispense with the cladding element 115. For example, instead of the cladding element 115, it is possible to provide two cladding elements 114 one beside the other, which, in a manner corresponding to the illustrations of FIGS. 12 and 13, are likewise swung downward into their second position from the intermediate-floor-forming aircraft-floor elements 100. This allows a reduction in the weight of an individual cladding element 114 which has to be moved. However, this variant requires a further sealing element on the intersecting edge of the two cladding elements 114 (of which just one is illustrated in FIG. 13). Of course, the cladding elements 114 can also each be formed so as to close a gangway-forming depression 210 in the aircraft floor 101.

As is illustrated in FIGS. 6 to 14, the aircraft region 20 in the lower deck 12 of the aircraft 10 can be very rapidly converted from a passenger-cabin configuration 21 to a cargo-space configuration 22. For example, it is possible for one or two crew members of the aircraft 10, following displacement of the push-together seats 40, 41, to release the locking elements 122, 126, 133 to enable the cladding elements 111, 112, 113 and 115 (and, as an option, cladding element 114) to swing from their respective first position into their second position. In the process, those surfaces of the cladding elements 111-115 which form the cladding of the passenger cabin 21 are concealed and therefore protected against damage. At the same time, other surfaces of the cladding elements 111-115 and of the aircraft-floor elements 100, 101 are exposed and, following the swing action, form the cladding of the cargo space 22. These cargo-space surfaces are distinguished, in particular, by their impact-resistance and/or scratch-resistance.

As a result of a system 205 for loading and fastening cargo being exposed at the same time, the conversion is possible in only a few minutes (for example 5 to 10 minutes), and therefore within the turnaround time of the aircraft 10. In addition, rather than any technical aids being necessary, the conversion can be done exclusively by hand The optional locking elements 122, 126, 133 can likewise be released by hand, in particular if a release mechanism is integrated in the respective aircraft-floor element 100, 101 or cladding element 111-115. A further advantage is that all the components which are required for the conversion are integrated in the aircraft-floor elements 100, 101 and need not be stored outside the aircraft. Therefore, conversion can take place at any time and in any place.

Figure 15:
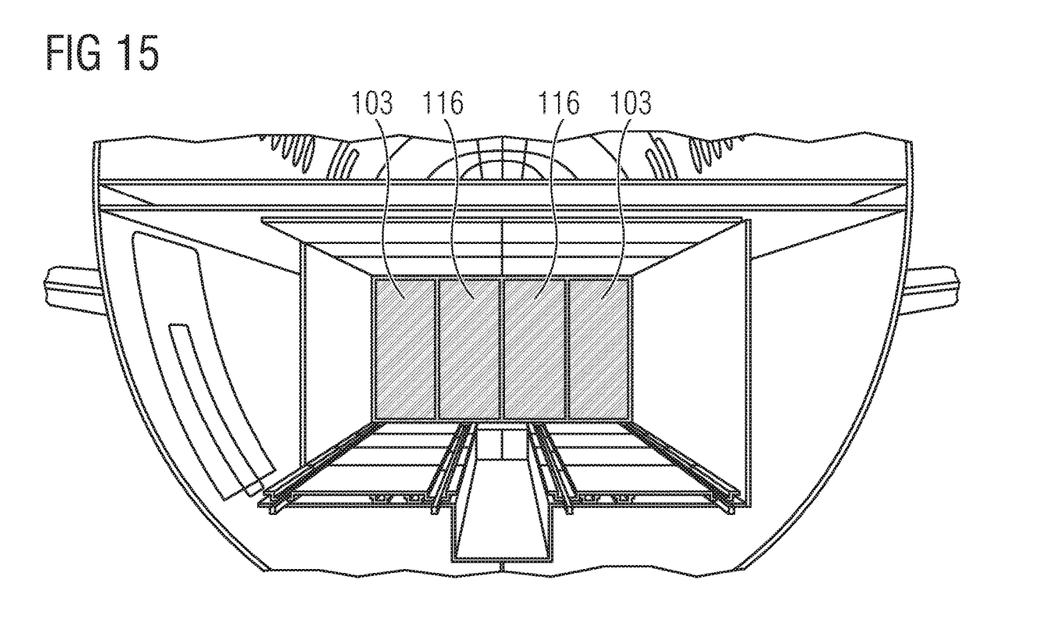
Figure 16:
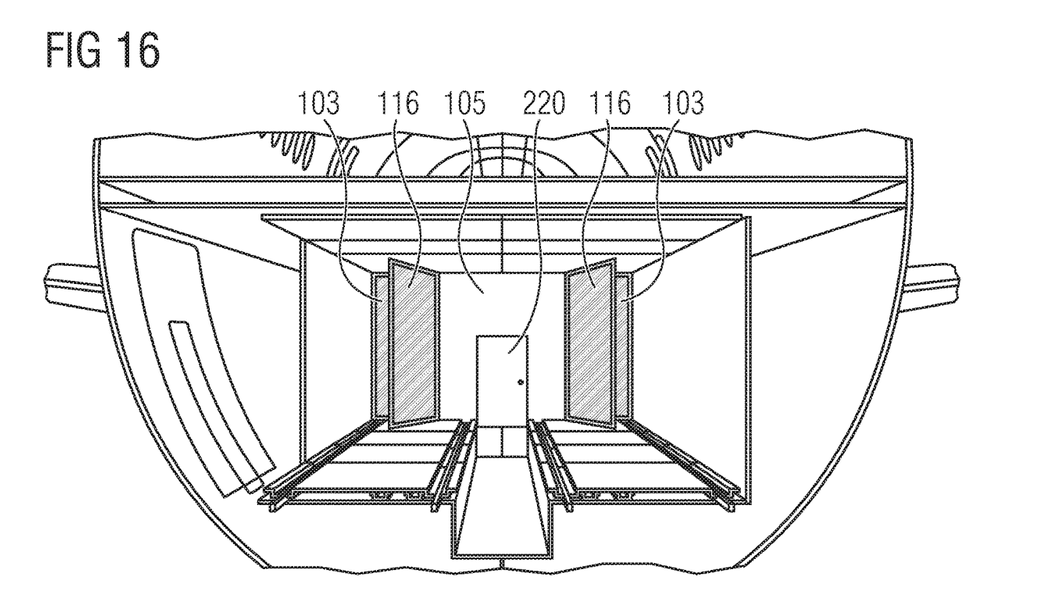

FIGS. 15 and 16 show, schematically, various states during the swing action of cladding elements 116 on a rear wall 103 of the aircraft region 20 from FIG. 6. The cladding elements 116 of the rear wall 103 are merely swung round along a vertical or horizontal axis in the Y-Z plane, and therefore a surface which is directed towards the passenger cabin 21 (see FIG. 15) is concealed and a surface which is suitable for the cargo-space configuration 22 is uncovered (see FIG. 16). A rear cargo-space wall 105 can be arranged alongside the rear wall 103 (behind the rear wall as seen in the longitudinal direction of the aircraft 10). The rear wall can establish a permanent gas-tight and/or liquid-tight (i.e., fluid-tight) termination of the cargo space 22 (and also of the passenger cabin 21). Therefore, as far as the cladding elements 116 are concerned, separately sealing elements can be dispensed with. It is also possible for the rear cargo-space wall 105 to have, as an option, a door or other access opening 220 so that, in the cargo-space configuration 22, further access to the cargo space 22 is ensured.

The variants, configurations and exemplary embodiments discussed above serve merely to describe the teaching claimed, but do not restrict this teaching to the variants, configurations and exemplary embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
    a fuselage,
    an upper passenger cabin within the fuselage comprising a plurality of passenger seats,
    a cargo space within the fuselage below the upper passenger cabin,
    a lower passenger cabin within the fuselage below the upper passenger cabin,
    an intermediate floor separating the cargo space and the lower passenger cabin from the upper passenger cabin, and
    a plurality of cladding elements below the upper passenger cabin, the plurality of cladding elements comprising a first cladding element hingedly connected to a portion of aircraft within the fuselage and pivotable about an axis of rotation from a first position to a second position to selectively delimit the cargo space and the lower passenger cabin,
    wherein, in the first position, the first cladding element is arranged parallel to a main plane of the intermediate floor and on a side of the intermediate floor which is directed towards the lower passenger cabin, and
    wherein, in the second position, the first cladding element is arranged at an angle to the main plane of the intermediate floor and forms a cladding delimiting the cargo space,
    wherein the first cladding element is arranged on an underside of the intermediate floor, said underside forming a ceiling of the lower passenger cabin when the first cladding element is in the first position.

2. The aircraft according to claim 1, wherein in the first position, the first cladding element forms a cladding delimiting the lower passenger cabin.

3. The aircraft according to claim 1, wherein, in the second position, the first cladding element forms a side wall, a rear wall or a front wall of the cargo space.

4. The aircraft according to claim 1, wherein, on at least one side edge, the first cladding element has a sealing element configured to establish a fluid-tight termination between the first cladding element and a further element.

5. The aircraft according to claim 1, further comprising:
    a locking element configured to fix the first cladding element in the first position and/or in the second position.

6. The aircraft according to claim 1, wherein, on a side which forms the cladding delimiting the cargo space, the first cladding element has an impact-resistant and/or scratch-resistant surface and, on a side which is located opposite the impact-resistant and/or scratch-resistant surface, it has a surface which forms the cladding for the passenger cabin.

7. The aircraft zone according to claim 1, further comprising a side-wall cladding for the lower passenger cabin.

8. The aircraft zone according to claim 1, wherein the plurality of cladding elements further comprises:
    a second cladding element, which can be swung from a first position into a second position,
    wherein, when the second cladding element is located in the second position, a surface of the second cladding element which, in the first position of the second cladding element, is directed towards the passenger cabin essentially fully covers over a surface of a side wall which is directed towards the passenger cabin.

9. The aircraft zone according to claim 1, further comprising:
    a cargo-space door configured to allow access from an area surrounding the aircraft into a portion of the aircraft comprising the plurality of cladding elements,
    wherein a third cladding element, which, in a first position, frees access from the cargo space to the cargo-space door and, in a second position, conceals the access from the cargo space to the cargo-space door.

10. The aircraft comprising:
    a fuselage,
    an upper passenger cabin within the fuselage comprising a plurality of passenger seats,
    a cargo space within the fuselage below the upper passenger cabin,
    a lower passenger cabin within the fuselage below the upper passenger cabin,
    an intermediate floor of the aircraft separating the cargo space and the lower passenger cabin from the upper passenger cabin,
    a lower deck floor below the intermediate floor,
    at least one seat rail within the lower passenger cabin, and
    a plurality of cladding elements below the upper passenger cabin, the plurality of cladding elements comprising a first cladding element hingedly connected to a portion of the aircraft within the fuselage and pivotable about an axis of rotation from a first position to a second position to selectively delimit the cargo space and the lower passenger cabin,
    wherein, in the first position, the first cladding element is arranged parallel to a main plane of the lower deck floor and on a side of the lower deck floor which is directed towards the lower passenger cabin, and
    wherein, in the second position, the first cladding element is arranged at an angle to the main plane of the lower deck floor and forms a cladding delimiting the cargo space,
    wherein, in the first position, the first cladding element forms a floor of the lower passenger cabin and the at least one seat rail is at least partially exposed through the first cladding element when the first cladding element is located in the first position.

11. The aircraft according to claim 10 wherein the first cladding element is formed in a number of parts, and wherein at least two parts of the first cladding element are spaced apart from one another, and therefore, in the respectively first position of the at least two parts of the first cladding element, the seat rail is exposed alongside the respective part of the first cladding element.

12. The aircraft according to claim 10, wherein the seat rail is formed in a number of parts in a longitudinal direction, and wherein the first cladding element has openings, through which the seat rail projects when the first cladding element is located in the first position.

13. The aircraft according to claim 10, further comprising:
a cargo-loading and/or -fastening system,
wherein the first cladding element covers the cargo-loading and/or -fastening system when the first cladding element is located in the first position, and frees the cargo-loading and/or -fastening system when the first cladding element is located in the second position.

* * * * *